(12) United States Patent
Sanglerat et al.

(10) Patent No.: US 6,706,096 B2
(45) Date of Patent: Mar. 16, 2004

(54) METHOD AND SYSTEM FOR PROTECTING BUILDINGS FROM SUBSURFACE GASES

(75) Inventors: Thierry R. Sanglerat, Newport Beach, CA (US); Gregory T. Corcoran, Escondido, CA (US); David W. Riotte, Lake Worth, FL (US)

(73) Assignee: Geosyntec Consultants, Inc., Boca Raton, FL (US)

( * ) Notice: Subject to any disclaimer, the term of this patent is extended or adjusted under 35 U.S.C. 154(b) by 66 days.

(21) Appl. No.: 10/042,631

(22) Filed: Jan. 11, 2002

(65) Prior Publication Data

US 2003/0131730 A1 Jul. 17, 2003

(51) Int. Cl.$^7$ ................................................ E02D 3/00
(52) U.S. Cl. ..................... 95/274; 405/80; 405/128.2; 52/169.5
(58) Field of Search ................. 95/273, 274, 291; 55/410; 405/52, 80, 128.1, 128.15, 128.2, 128.45, 128.7; 52/169.5; 454/909

(56) References Cited

U.S. PATENT DOCUMENTS

| | | | | |
|---|---|---|---|---|
| 4,620,398 A | * | 11/1986 | Wallin | 52/169.1 |
| 4,869,832 A | * | 9/1989 | Lamarre | 95/260 |
| 4,938,124 A | * | 7/1990 | Garza | 454/343 |
| 4,957,394 A | * | 9/1990 | Jarnagin et al. | 405/229 |
| 5,013,183 A | * | 5/1991 | Eriksson et al. | 405/59 |
| 5,174,800 A | * | 12/1992 | Schwilling et al. | 96/154 |
| 5,775,840 A | * | 7/1998 | Knieper et al. | 405/129.85 |
| 5,836,815 A | * | 11/1998 | Jennemann | 454/341 |

\* cited by examiner

Primary Examiner—Frank M. Lawrence
(74) Attorney, Agent, or Firm—Baker, Donelson et al.

(57) ABSTRACT

Subterranean gases are removed from a building site by drawing air from ambience and passing the air through an air permeable bed of materials (10) located at the site as a diffused air stream. The subterranean gases become entrained in the diffused air stream which is then exhausted from the bed and removed from the site. A system for practicing the method has slotted air injection conduits (12) interspersed between slotted air extraction conduits (15) embedded in an air permeable bed of materials beneath the building. The system has a blower (18) for drawing air from the extraction conduits and removing it from the site.

1 Claim, 2 Drawing Sheets

METHOD AND SYSTEM FOR PROTECTING BUILDINGS FROM SUBSURFACE GASES

TECHNICAL FIELD

This invention relates to methods and systems for protecting buildings from subsurface gases.

BACKGROUND OF THE INVENTION

Buildings are often erected on sites from which subterranean gases are vented to ambience. These gases can be hazardous to human health. Exemplary of such toxic gas are radon, benzene and chlorine. In addition to toxic gases, some subterranean gases are explosive such as methane and sewer gases that are outgassed from landfills and from old industrial sites. When inhabitable buildings are constructed at such sites they rarely block out these gases. Even thick concrete slab foundations are porous and have cracks through which these gases may seep into the building itself.

Heretofore attempts have been made to vent subterranean gases rising beneath buildings to the periphery of building sites. This has been done by embedding slotted conduits in the granular bed beneath the concrete foundation into which the gases may seep and be diverted from beneath the building to its periphery. This approach however has been only marginally effective as much of the subterranean gas still bypasses the conduits and seeps into the foundation.

It thus is seen that a need has long existed for a method and system for removing subterranean gases from building sites in an effective manner. Accordingly, it is to the provision of such that the present invention is primarily directed.

SUMMARY OF THE INVENTION

In a preferred form of the invention, subterranean gases are removed from a building site by drawing air from ambience and passing the air through an air permeable bed of materials located at the site as a diffused air stream. The subterranean gases become entrained in the diffused air stream which is then exhausted from the bed and removed from the site. A system usable in practicing the method has ambient air conduits interspersed between air extraction conduits embedded in an air permeable bed of materials beneath the building. The system has means for drawing air from the extraction conduits and removing it from the site.

DETAILED DESCRIPTION

Figure 1:
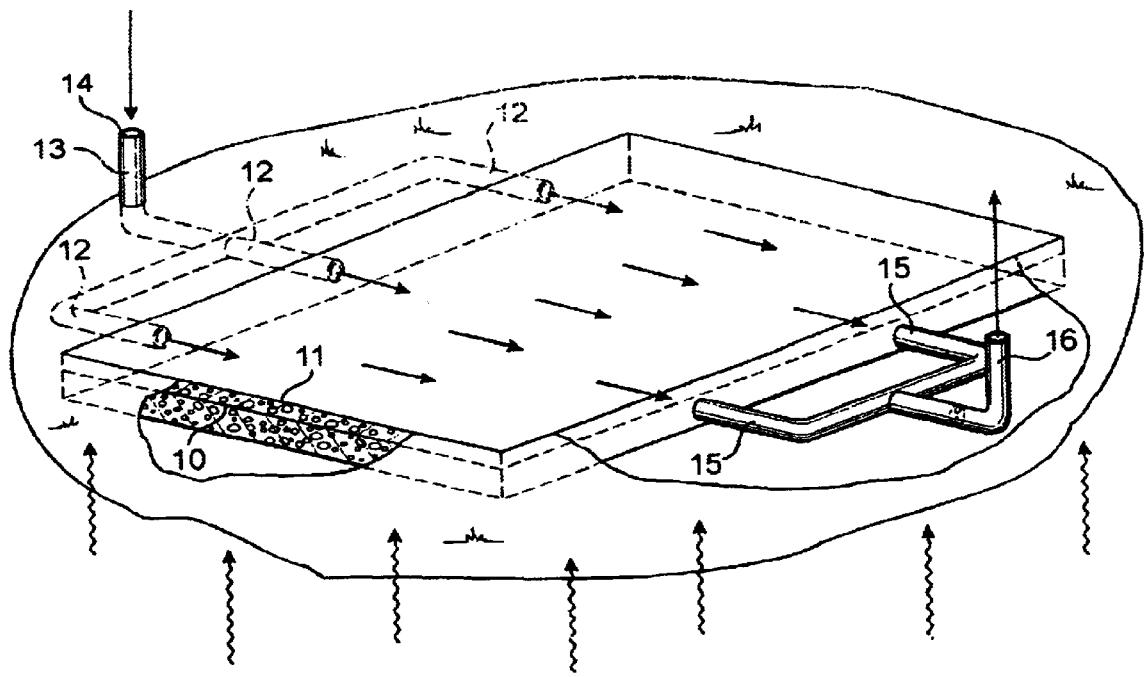
FIG. 1 is a plan view of a building foundation showing a bed of particulate materials in which the new system is incorporated.
Figure 2:
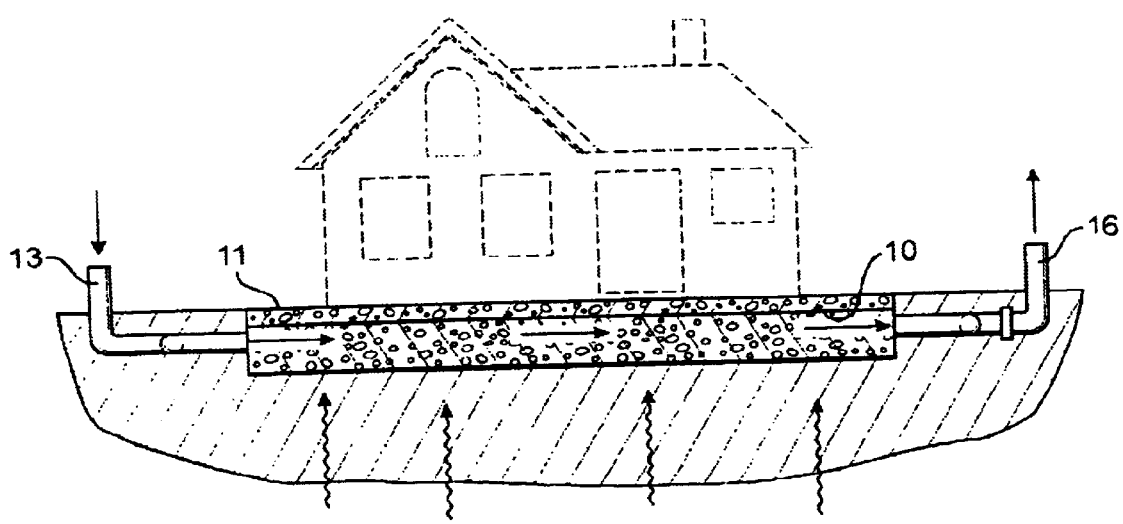
FIG. 2 is a side view thereof.
Figure 3:
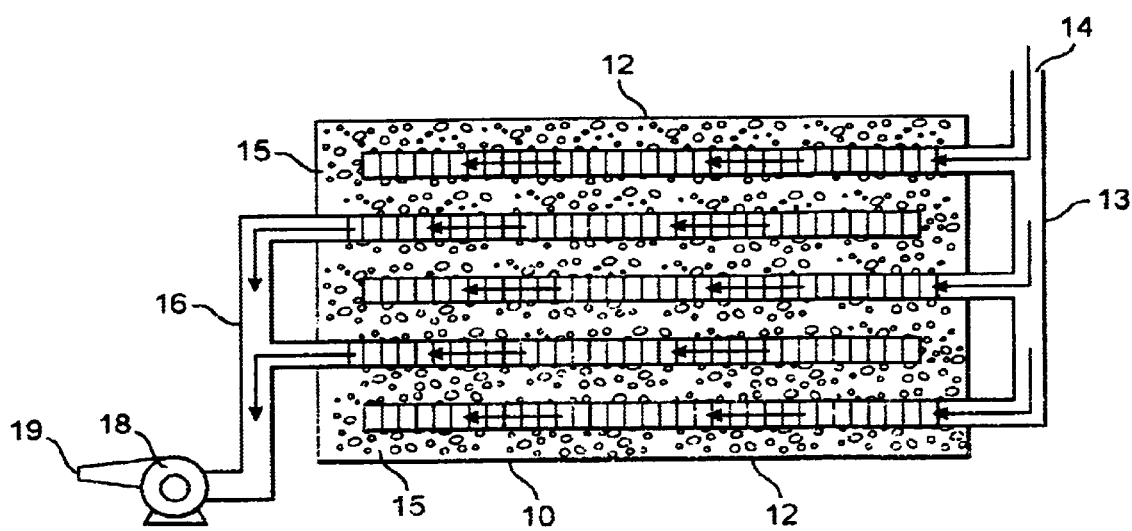
FIG. 3 is a plan view.

With reference to the drawing there is shown a bed of air pervasive materials 10 at a building site. The bed is conventionally formed in situ before the building foundation 11 is poured upon the bed. The particulate materials may be constructed of any high permeable material including, but not limited to, geosynthetics, gravel, rocks, or bits of crushed glass. The foundation 11 is typically made of concrete.

Embedded in the bed are air induction conduits 12 that extend from an air induction manifold 13 having an inlet 14 that is open to ambience. Also embedded in the bed are two slotted air extraction conduits 15 that extend from an air extraction manifold 16. A blower 18 is mounted in fluid communications with the manifold 16 from which air is exhausted through a system outlet 19 to ambience. Alternatively the exhaust from the blower may be treated as by being passed thorough a carbon absorption medium or the exhaust fired. The number and size of the conduits 12 and 15 vary depending, of course, on the size of the building site. The number and size of the slots may also vary. These conduit openings may be shaped other than as slots such as, for example, as fields of perforations. The two manifolds are preferably unslotted and preferably lay outside of the bed 10, as shown.

In operation the blower 18 draws air out of the air extraction manifold 16 and conduits 15. This in turn draws air from the air induction conduits 12 and manifold 13. Air exits the induction conduits through their slots and flows through the particulate materials of the bed 10. Gases in the bed thus become entrained in this flow of ambient air. The flow then enters the air extraction conduits through their slots. In this manner the bed is continually swept and purged of any subterranean gases present which are removed from beneath the building.

It thus is seen that a new method and system is provided that is of a simple construction and operation and yet which has been found to be highly effective. Although the invention has been shown and described in its preferred forms, it should be understood that many modifications may be made thereto without departure from the spirit and scope of the invention as set forth in the following claims.

What is claimed is:

1. A method of removing subterranean gases from a building site having a plurality of slotted air induction conduits in fluid communication with ambience embedded in an air permeable bed of materials beneath a building and a plurality of slotted air exhaust conduits embedded in the air permeable bed of materials, wherein air is drawn out of the air exhaust conduits thereby drawing ambient air into the air induction conduits and through the bed of air permeable materials to entrain subterraneous gases in the air stream as it passes through the bed.

* * * * *